US012571705B2

(12) United States Patent
Bang

(10) Patent No.: US 12,571,705 B2
(45) Date of Patent: Mar. 10, 2026

(54) INDIRECT TIRE PRESSURE MONITORING APPARATUS AND METHOD

(71) Applicant: HL MANDO CORPORATION, Pyeongtaek (KR)

(72) Inventor: Jehyun Bang, Uiwang (KR)

(73) Assignee: HL MANDO CORPORATION, Pyeongtaek (KR)

( * ) Notice: Subject to any disclaimer, the term of this patent is extended or adjusted under 35 U.S.C. 154(b) by 258 days.

(21) Appl. No.: 18/180,153

(22) Filed: Mar. 8, 2023

(65) Prior Publication Data

US 2023/0288293 A1 Sep. 14, 2023

(30) Foreign Application Priority Data

Mar. 10, 2022 (KR) ........................ 10-2022-0030148

(51) Int. Cl.
*G01M 17/02* (2006.01)
*B60C 23/04* (2006.01)

(52) U.S. Cl.
CPC ......... *G01M 17/02* (2013.01); *B60C 23/0488* (2013.01)

(58) Field of Classification Search
CPC ....... B60C 23/00; B60C 23/006; B60C 23/02; B60C 23/04; B60C 23/0408; B60C 23/0416; B60C 23/042; B60C 23/0481; B60C 23/0488; B60C 23/06; B60C 23/062; B60T 8/172; B60Y 2400/301; B60Y 2400/3032; G01M 17/02
USPC ........................................................ 340/443
See application file for complete search history.

(56) References Cited

U.S. PATENT DOCUMENTS

| | | | | |
|---|---|---|---|---|
| 5,721,528 A | * | 2/1998 | Boesch ................. | B60C 23/061 701/30.6 |
| 5,923,244 A | * | 7/1999 | Jones .................... | B60C 23/061 340/444 |
| 6,034,595 A | * | 3/2000 | Yanase ................. | B60C 23/061 73/146 |
| 2005/0087008 A1 | * | 4/2005 | Yanase ................. | B60C 23/061 73/146 |
| 2005/0113992 A1 | * | 5/2005 | Kitano ................. | B60C 23/061 701/74 |
| 2006/0042367 A1 | * | 3/2006 | Matsuura .............. | B60C 23/061 73/146 |
| 2011/0190974 A1 | * | 8/2011 | Wada .................... | B60C 23/061 701/31.4 |

FOREIGN PATENT DOCUMENTS

| | | |
|---|---|---|
| JP | 2001206028 A | 7/2001 |
| KR | 100387292 B2 | 10/2003 |

* cited by examiner

*Primary Examiner* — Stephen R Burgdorf
(74) *Attorney, Agent, or Firm* — Harvest IP Law, LLP

(57) ABSTRACT

Disclosed herein is an indirect tire pressure monitoring apparatus including a wheel speed sensor installed in each wheel to detect a wheel speed, and a controller electrically connected to the wheel speed sensor, wherein the controller determines a decompression determination indicator according to the wheel speed detected by the wheel speed sensor, determines a turning compensation amount for turning compensation of the decompression determination indicator, compensates the decompression determination indicator based on the turning compensation amount, and determines whether the tire is decompressed based on the compensated decompression determination indicator.

14 Claims, 9 Drawing Sheets

COMPENSATE INDICATORS FOR DECOMPRESSION DETERMINATION

COMPENSATE T3 (T3')
(T3 – TURNING COMPENSATION AMOUNT)                    ~200

COMPENSATE T4 (T4')
(T4 – TURNING COMPENSATION AMOUNT)                    ~202

RETURN 10
10a — FL WHEEL SPEED SENSOR
10b — FR WHEEL SPEED SENSOR
10c — RL WHEEL SPEED SENSOR
10d — RR WHEEL SPEED SENSOR

30
CONTROLLER
31
PROCESSOR
32
MEMORY

40
DISPLAY

|  | Index1 | Index2 |
|---|---|---|
|  | −T1+T2 | −T3″+T4″ |
| FL | + | + |
| FL, RR | + | + |
| FL, RL, RR | + | + |
| FL, FR, RR | + | + |
| RR | + | + |
| FR | − | − |
| FR, RL | − | − |
| FR, RL, RR | − | − |
| FR, FL, RL | − | − |
| RL | − | − |

INDIRECT TIRE PRESSURE MONITORING APPARATUS AND METHOD

CROSS-REFERENCE TO RELATED APPLICATION

This application claims the benefit of Korean Patent Application No. 10-2022-0030148, filed on Mar. 10, 2022, in the Korean Intellectual Property Office, the disclosure of which is incorporated herein by reference.

BACKGROUND

1. Field

Embodiments of the present disclosure relate to an indirect tire pressure monitoring apparatus and method for monitoring a pressure of a tire using a wheel speed detected through a wheel speed sensor.

2. Description of the Related Art

An indirect tire pressure monitoring apparatus indirectly estimates a relative tire pressure without a tire pressure sensor using a change in wheel speed output from a wheel speed sensor due to depressurization.

The indirect tire pressure monitoring apparatus estimates a pressure of each tire using a wheel radius analysis (WRA) algorithm which is one technique for indirectly monitoring a tire pressure.

The WRA algorithm learns a reference value of an indicator used for decompression determination for a certain period of time using a difference in wheel speed, compares a difference between the reference value and a current value, and estimates a decompressed state of a tire. In addition, when the relative tire pressure decreases to a predetermined value or more, an alarm is issued.

However, a wheel radius of a tire is also affected by factors other than decompression, such as a variation in tire load during turning. Since wheel radii of left and right tires change when turning traveling is performed, in order to correctly determine tire decompression, it is necessary to distinguish whether a result obtained from the WRA is caused by tire decompression or an influence of turning traveling.

SUMMARY

Therefore, it is an aspect of the present disclosure to provide an indirect tire pressure monitoring apparatus and method, which are capable of improving accuracy of tire decompression determination by compensating for a change in tire wheel radius due to turning traveling.

Additional aspects of the present disclosure will be set forth in part in the description which follows and, in part, will be obvious from the description, or may be learned by practice of the disclosure.

In accordance with one aspect of the present disclosure, an indirect tire pressure monitoring apparatus includes a wheel speed sensor installed in each wheel to detect a wheel speed, and a controller electrically connected to the wheel speed sensor. The controller determines a decompression determination indicator according to the wheel speed detected by the wheel speed sensor, determines a turning compensation amount for turning compensation of the decompression determination indicator, compensates the decompression determination indicator based on the turning compensation amount, and determines whether the tire is decompressed based on the compensated decompression determination indicator.

The controller may obtain a first time taken for one rotation of a tone wheel of a rear left wheel RL, a second time taken for one rotation of a tone wheel of a front left wheel FL, a third time taken for one rotation of a tone wheel of a rear right wheel RR, and a fourth time taken for one rotation of a tone wheel of a front right wheel FR, and determine the decompression determination indicator including a first indicator which is a time difference between the second time and the first time in comparison to the first time, a second indicator which is a time difference between the fourth time and the third time in comparison to the third time, a third indicator which is a time difference between the second time and the third time in comparison to the third time, and a fourth indicator which is a time difference between the fourth time and the first time in comparison to the first time.

The controller may compensate the third indicator and the fourth indicator by applying values of opposite signs of the turning compensation amount to the third indicator and the fourth indicator.

The controller may determine a first index according to the first indicator and the second indicator, determine a second index according to a compensated third indicator and a compensated fourth indicator, and determine whether a tire is decompressed based on the first index and the second index.

The controller may determine the turning compensation amount based on the wheel speed.

The controller may obtain a first time taken for one rotation of a tone wheel of a rear left wheel RL, a second time taken for one rotation of a tone wheel of a front left wheel FL, a third time taken for one rotation of a tone wheel of a rear right wheel RR, and a fourth time taken for one rotation of a tone wheel of a front right wheel FR, and determine the decompression determination indicator including a first indicator which is a time difference between the second time and the first time in comparison to the first time, a second indicator which is a time difference between the fourth time and the third time in comparison to the third time, a third indicator which is a time difference between the second time and the third time in comparison to the third time, and a fourth indicator which is a time difference between the fourth time and the first time in comparison to the first time.

The controller may determine a fifth indicator, which is a time difference between the third time and the first time in comparison to the first time or a time difference between the fourth time and the second time in comparison to the second time, as the turning compensation amount.

The controller may compensate the third indicator and the fourth indicator by applying values of opposite signs of the turning compensation amount to the third indicator and the fourth indicator.

The controller may determine a first index according to the first indicator and the second indicator, determine a second index according to a compensated third indicator and a compensated fourth indicator, and determine whether a tire is decompressed based on the first index and the second index.

The controller may determine the turning compensation amount based on the wheel speed and a yaw rate detected by a yaw rate sensor.

In accordance with another aspect of the present disclosure, an indirect tire pressure monitoring method includes detecting a wheel speed of each wheel through a wheel speed sensor, determining a decompression determination indicator according to the wheel speed, determining a turning compensation amount for turning compensation of the decompression determination indicator, compensating the decompression determination indicator based on the turning compensation amount, and determining whether a tire is decompressed based on the compensated decompression determination indicator.

The determining of the decompression determination indicator may include obtaining a first time taken for one rotation of a tone wheel of a rear left wheel RL, a second time taken for one rotation of a tone wheel of a front left wheel FL, a third time taken for one rotation of a tone wheel of a rear right wheel RR, and a fourth time taken for one rotation of a tone wheel of a front right wheel FR, and determining the decompression determination indicator including a first indicator which is a time difference between the second time and the first time in comparison to the first time, a second indicator which is a time difference between the fourth time and the third time in comparison to the third time, a third indicator which is a time difference between the second time and the third time in comparison to the third time, and a fourth indicator which is a time difference between the fourth time and the first time in comparison to the first time.

The determining of the decompression determination indicator may include compensating the third indicator and the fourth indicator by applying values of opposite signs of the turning compensation amount to the third indicator and the fourth indicator.

The determining of whether the tire is decompressed may include determining a first index according to the first indicator and the second indicator, determining a second index according to a compensated third indicator and a compensated fourth indicator, and determining whether a tire is decompressed based on the first index and the second index.

The determining of the turning compensation amount may include determining the turning compensation amount based on the wheel speed.

The determining of the turning compensation amount comprises obtaining a first time taken for one rotation of a tone wheel of a rear left wheel RL, a second time taken for one rotation of a tone wheel of a front left wheel FL, a third time taken for one rotation of a tone wheel of a rear right wheel RR, and a fourth time taken for one rotation of a tone wheel of a front right wheel FR, and determining the decompression determination indicator including a first indicator which is a time difference between the second time and the first time in comparison to the first time, a second indicator which is a time difference between the fourth time and the third time in comparison to the third time, a third indicator which is a time difference between the second time and the third time in comparison to the third time, and a fourth indicator which is a time difference between the fourth time and the first time in comparison to the first time.

The determining of the turning compensation amount may include determining a fifth indicator, which is a time difference between the third time and the first time in comparison to the first time or a time difference between the fourth time and the second time in comparison to the second time, as the turning compensation amount.

The compensating of the decompression determination indicator may include compensating the third indicator and the fourth indicator by applying values of opposite signs of the turning compensation amount to the third indicator and the fourth indicator.

The determining of whether the tire is decompressed may include determining a first index according to the first indicator and the second indicator, determining a second index according to a compensated third indicator and a compensated fourth indicator, and determining whether a tire is decompressed based on the first index and the second index.

The determining of the turning compensation amount may include determining the turning compensation amount based on the wheel speed and a yaw rate detected by a yaw rate sensor.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
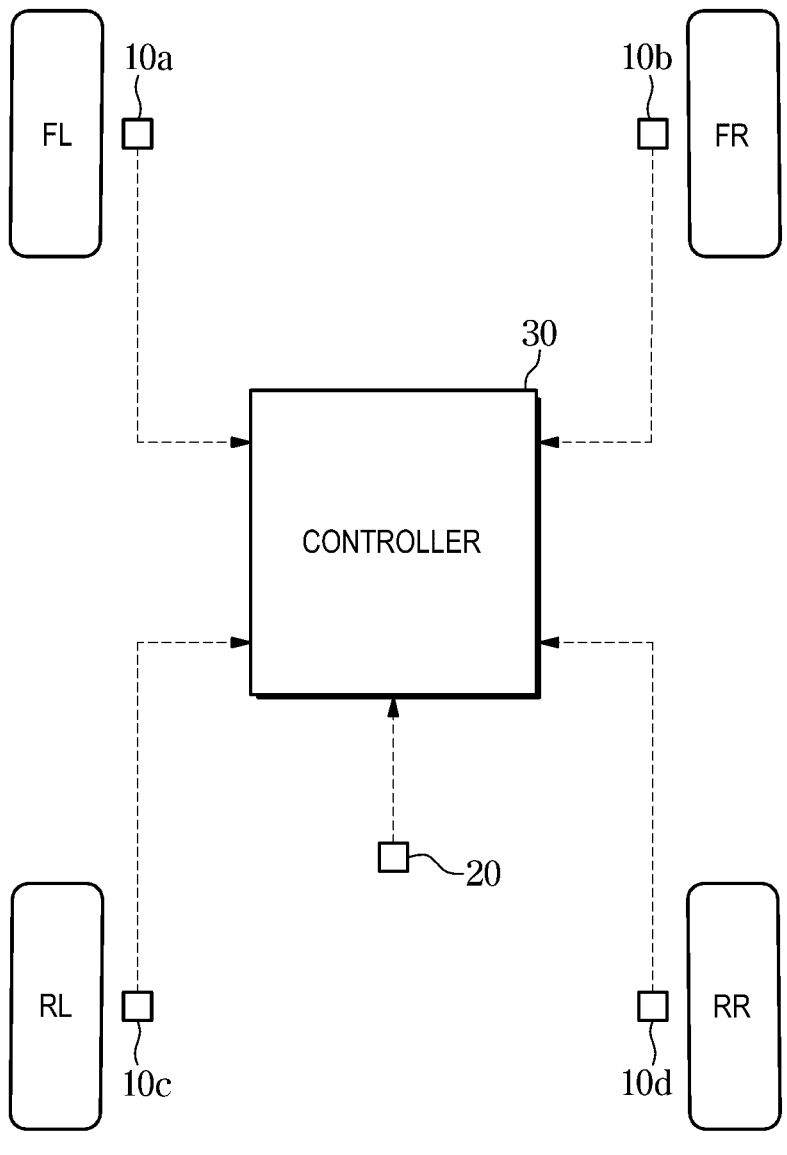
FIG. 1 is a block diagram illustrating an indirect tire pressure monitoring apparatus according to a first embodiment.

The same reference numeral refers to the same component throughout the present specification. The present specification does not describe all components of embodiments, with common descriptions in the technical field to which the present disclosure pertains and overlapping descriptions between the embodiments being omitted. Terms "part," "module," "member," and "block" used herein may be implemented in software or hardware, and according to embodiments, a plurality of "parts," "modules," "members," and "blocks" can be implemented in a single component or a single "part," "module," "member," or "block" can include a plurality of components.

Throughout the present specification, when a part is referred to as being "connected" to other part, this includes not only a direct connection but also an indirect connection, and the indirect connection includes a connection through a wireless communication network.

Further, when a part is referred to as "including" a component, this means that the part can include other elements, not excluding the other components unless specifically stated otherwise.

Throughout the present specification, when a member is referred to as being "on" another member, this includes not only when the member is in contact with another member, but also when still another member is present between the member and another member.

Terms "first," "second," and the like are used to distinguish one component from another component, and components are not limited by these terms. The singular forms include plural forms unless the context clearly notes otherwise.

In each operation, a reference numeral is used for convenience of description, but this reference numeral does not describe the order of the operations, and the operations may be performed differently from the described order unless clearly specified in the context.

FIG. 1 is a block diagram illustrating an indirect tire pressure monitoring apparatus according to a first embodiment.

Referring to FIG. 1, the indirect tire pressure monitoring apparatus may include a wheel speed sensor 10, a yaw rate sensor 20, and a controller 30.

The wheel speed sensor 10 and the yaw rate sensor 20 are electrically connected to the controller 30.

The wheel speed sensor 10 detects a wheel speed of each tire.

The wheel speed sensor 10 may include a front left wheel speed sensor 10a installed at a front left wheel FL of a vehicle to detect a speed of the front left wheel FL, a front right wheel speed sensor 10b installed at a front right wheel FR to detect a speed of the front right wheel FR, a rear left wheel speed sensor 10c installed at a rear left wheel RL to detect a speed of the rear left wheel RL, and a rear right wheel speed sensor 10d installed at a rear right wheel RR to detect a speed of the rear right wheel RR.

The wheel speed sensor 10 may transmit detected wheel speed signals to the controller 30.

Figure 2:
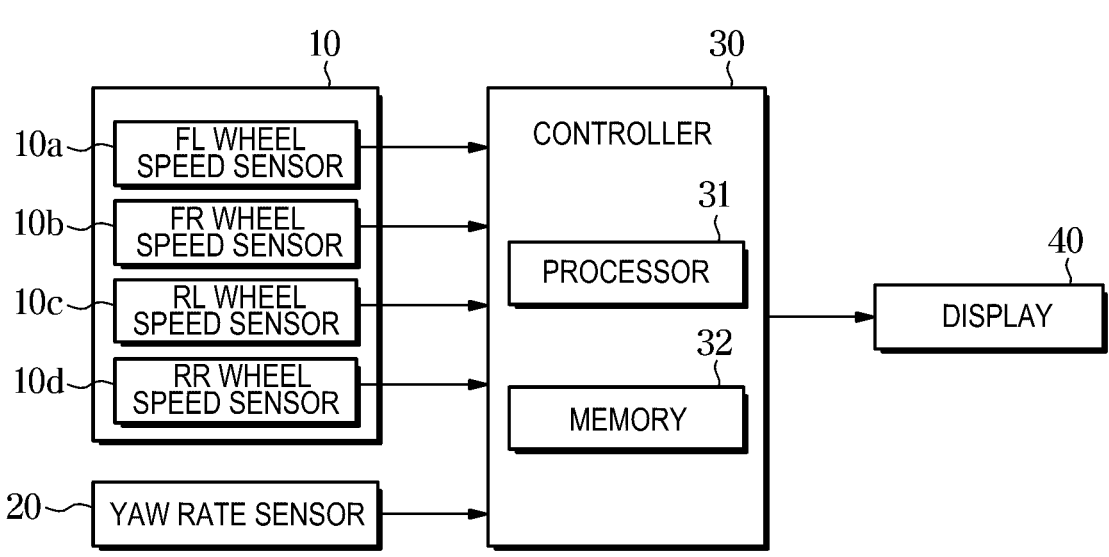
FIG. 2 is a diagram for describing wheel speed detection using a wheel speed sensor in the indirect tire pressure monitoring apparatus according to the first embodiment.

FIG. 2 is a diagram for describing wheel speed detection using a wheel speed sensor in the indirect tire pressure monitoring apparatus according to the first embodiment.

Referring to FIG. 2, the wheel speed sensor 10 is installed at each of the front and rear wheels FL, FR, RL, and RR of the vehicle and detects wheel speed information of each tire.

The wheel speed sensor 10 generates a predetermined number of pulses according to rotation of the wheel and detects the wheel speed information including a rotating angular speed.

The wheel speed sensor 10 may include a pole piece 11 formed of a magnetic material, and a tone wheel 12 installed at a wheel to be spaced a predetermined distance from the pole piece 11 to be rotated. In a configuration of the pole piece 11, reference numeral 13 is a coil, reference numeral 14 is a permanent magnet, and reference numeral 15 is a signal lead.

A plurality of teeth 12a are formed on an outer circumferential surface of the tone wheel 12.

When the tone wheel 12 is rotated, the teeth 12a cause a change in a magnetic field of the pole piece 11 so that an alternating-current (AC) signal is output from the tone wheel 12.

A wheel speed signal in the form of a pulse is generated from the AC signal output from the tone wheel 12 and provided to the controller 30. A pulse width of the wheel speed signal in the form of a pulse is inversely proportional to a wheel speed. As the wheel speed increases, the pulse width decreases, and conversely, as the wheel speed decreases, the pulse width increases. Thus, the controller 30 may detect a rotating angular speed from the wheel speed signal in the form of a pulse.

The controller 30 may receive an analog signal output from the wheel speed sensor 10 and convert the analog signal into digital data through an analog-to-digital (A/D) conversion circuit.

Referring to FIG. 1 again, the yaw rate sensor 20 detects a yaw rate of the vehicle. The yaw rate sensor 20 may transmit a detected yaw rate signal to the controller 30.

Figure 3:
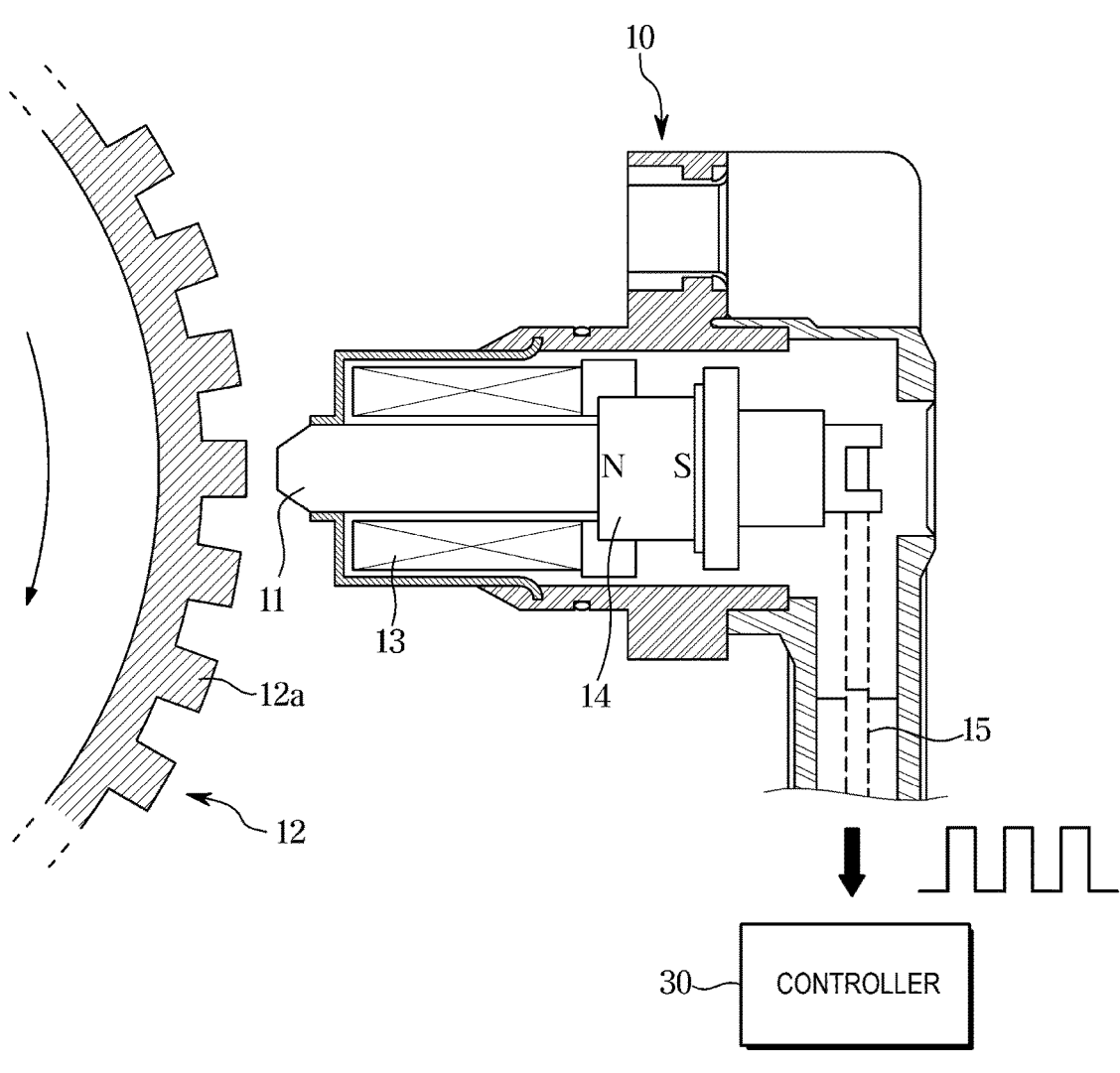
FIG. 3 is a control block diagram of the indirect tire pressure monitoring apparatus according to the first embodiment.

FIG. 3 is a control block diagram of the indirect tire pressure monitoring apparatus according to the first embodiment.

Referring to FIG. 3, the wheel speed sensor 10 and the yaw rate sensor 20 are electrically connected to an input side of the controller 30.

A display 40 is electrically connected to an output side of the controller 30.

In response to a control signal of the controller 30, the display 40 may display a pressure of each tire or a tire decompression state. The display 40 may include a low pressure warning light and turn the low pressure warning light on to warn that a tire pressure is low.

The display 40 may be a cluster which is an instrument panel displaying various types of information of the vehicle.

The controller 30 may include a processor 31 and a memory 32.

The processor 31 performs overall control of the indirect tire pressure monitoring apparatus.

The memory 32 may store a program and data for processing outputs of the wheel speed sensor 10 and yaw rate sensor 20 and store a program and data for learning, estimating, and determining a tire pressure.

The memory 32 may temporarily store detected data received from the wheel speed sensor 10 and the yaw rate sensor 20 and temporarily store a processed result of the detected data of the processor 31.

The memory 32 may include volatile memories such as a static random access memory (SRAM) and a dynamic RAM (DRAM) as well as non-volatile memories such as a flash memory, a read only memory (ROM) and an erasable and programmable ROM (EPROM).

The controller 30 compares wheel speed values detected from the four wheel speed sensors 10a, 10b, 10c and 10d, estimates a change amount of a wheel radius of each tire, and determines whether each tire is decompressed. In general, when a decrease occurs in a tire pressure, a rotation radius of the corresponding tire decreases and a rotating speed increases compared to a wheel with a normal pressure. Therefore, it is possible to analyze a rotation radius of each tire through a relative comparison between the speeds of the four wheels of the vehicle. This is effective in determining whether a tire pressure is low when a pressure decrease occurs in one to three tires.

The controller 30 determines indicators used for tire decompression determination according to the wheel speeds detected by the four wheel speed sensors 10a, 10b, 10c and 10d.

The controller 30 applies a turning compensation amount according to the yaw rate detected by the yaw rate sensor 20 to the indicators used for the tire decompression determination, thereby compensating for an influence of turning traveling on the indicators used for tire decompression determination. Since the wheel radius of the tire is affected by a change in tire load during turning in addition to the decompression, a change in wheel radius of left and right tires occurs during turning traveling. Therefore, it is possible to accurately determine whether the tire is decompressed only when an influence due to the turning traveling is compensated for.

The controller 30 determines the decompression of the tire according to the compensated indicators of the decompression determination.

The controller 30 may display a decompressed state of the tire on the display 40.

Figure 4:
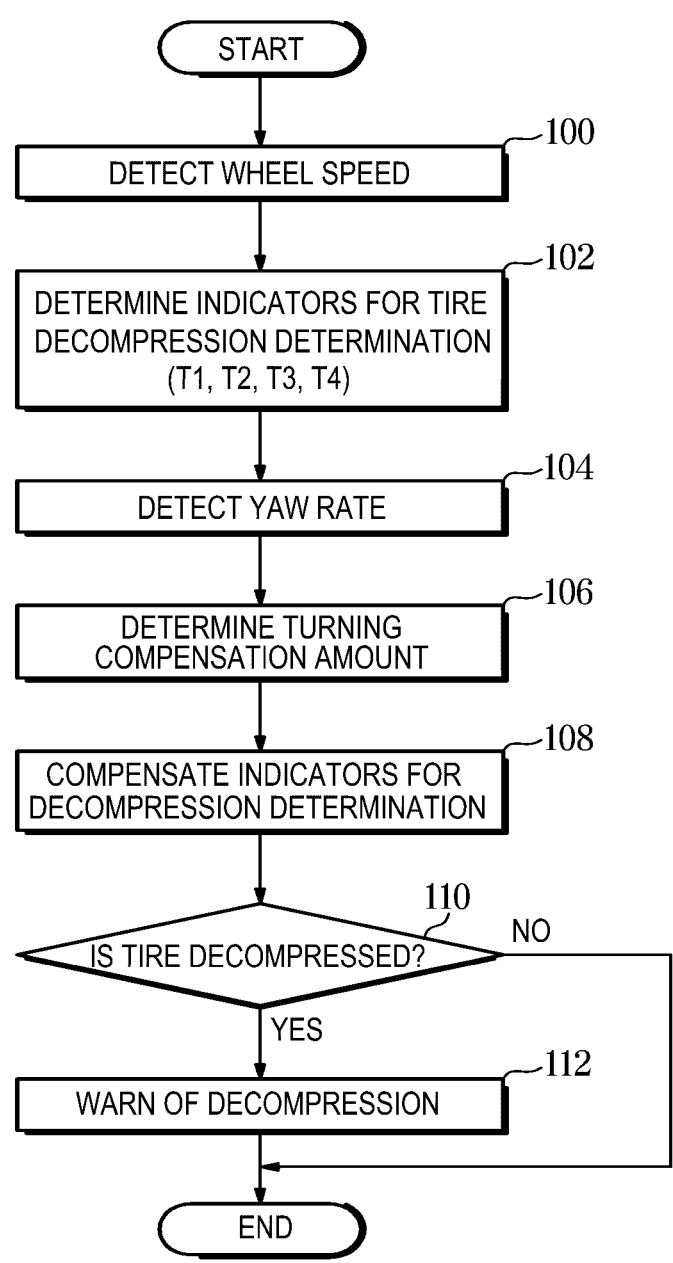
FIG. 4 is a control flowchart illustrating an indirect tire pressure monitoring method according to the first embodiment.
Figure 5:
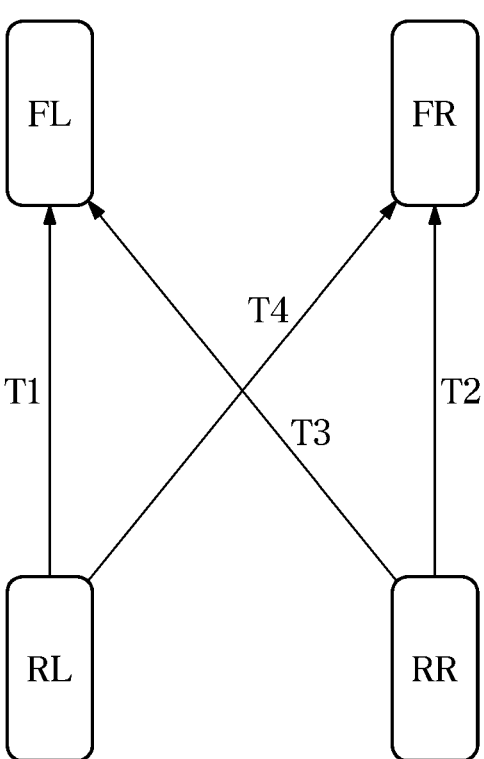
FIG. 5 is a diagram illustrating indicators used for decompression determination in the indirect tire pressure monitoring method according to the first embodiment.

FIG. 4 is a control flowchart illustrating an indirect tire pressure monitoring method according to the first embodiment, and FIG. 5 is a diagram illustrating indicators used for decompression determination in the indirect tire pressure monitoring method according to the first embodiment.

Referring to FIGS. 4 and 5, the controller 30 detects each wheel speed through the wheel speed sensor 10 first (100).

The controller 30 determines indicators for tire decompression determination using the wheel speeds (102).

A first indicator T1, a second indicator T2, a third indicator T3, and a fourth indicator T4 may be used as the indicators used for the tire decompression determination.

T1, T2, T3, and T4 may be determined by comparing the wheel speeds.

T1 may be obtained from wheel speeds of the rear left wheel RL and the front left wheel FL.

T1 may be calculated according to a first time $T_{RL}$ taken for one rotation of the tone wheel of the rear left wheel RL, and a second time $T_{FL}$ taken for one rotation of the tone wheel of the front left wheel FL. For example, T1 may be a time difference between $T_{FL}$ and $T_{RL}$ in comparison to $T_{RL}$ which is the time taken for one rotation of the tone wheel of the rear left wheel RL.

T1 may be calculated as in the following equation 1.

$$T_1 = \frac{T_{FL} - T_{RL}}{T_{RL}}$$ [Equation 1]

Here, $T_{FL}$ denotes the time taken for one rotation of the tone wheel of the front left wheel FL, and $T_{RL}$ denotes the time taken for one rotation of the tone wheel of the rear left wheel RL.

T2 may be obtained from wheel speeds of the rear right wheel RR and the front right wheel FR.

T2 may be calculated according to a third time $T_{RR}$ taken for one rotation of the tone wheel of the rear right wheel RR, and a fourth time $T_{FR}$ taken for one rotation of the tone wheel of the front right wheel FR. For example, T2 may be a time difference between $T_{FR}$ and $T_{RR}$ in comparison to $T_{RR}$ which is the time taken for one rotation of the tone wheel of the rear right wheel RR.

T2 may be calculated as in the following equation 2.

$$T_2 = \frac{T_{FR} - T_{RR}}{T_{RR}}$$ [Equation 2]

Here, $T_{FR}$ denotes the time taken for one rotation of the tone wheel of the front right wheel FR, and $T_{RR}$ denotes the time taken for one rotation of the tone wheel of the rear right wheel RR.

T3 may be obtained from the wheel speeds of the rear right wheel RR and the front left wheel FL.

T3 may be calculated according to the time $T_{RR}$ taken for one rotation of the tone wheel of the rear right wheel RR, and the time $T_{FL}$ taken for one rotation of the tone wheel of the front left wheel FL. For example, T3 may be a time difference between $T_{FL}$ and $T_{RR}$ in comparison to $T_{RR}$ which is the time taken for one rotation of the tone wheel of the rear right wheel RR.

T3 may be calculated as in the following equation 3.

$$T_3 = \frac{T_{FL} - T_{RR}}{T_{RR}}$$ [Equation 3]

Here, $T_{FL}$ denotes the time taken for one rotation of the tone wheel of the front left wheel FL, and $T_{RR}$ denotes the time taken for one rotation of the tone wheel of the rear right wheel RR.

T4 may be obtained from the wheel speeds of the rear left wheel RL and the front right wheel FR.

T4 may be calculated according to the time $T_{RL}$ taken for one rotation of the tone wheel of the rear left wheel RL, and the time $T_{FR}$ taken for one rotation of the tone wheel of the front right wheel FR. For example, T4 may be a time difference between $T_{FR}$ and $T_{RL}$ in comparison to $T_{RL}$ which is the time taken for one rotation of the tone wheel of the rear left wheel RL.

T4 may be calculated as in the following equation 4.

$$T_4 = \frac{T_{FR} - T_{RL}}{T_{RL}}$$ [Equation 4]

Here, $T_{FR}$ denotes the time taken for one rotation of the tone wheel of the front right wheel FR, and $T_{RL}$ denotes the time taken for one rotation of the tone wheel of the rear left wheel RL.

Although T1, T2, T3, and T4 each have been described as being obtained from the time taken for one rotation of the tone wheel of each wheel, they may also be obtained from a rotating angular speed of each wheel.

The controller 30 detects a yaw rate of the vehicle through the yaw rate sensor 20 (104).

The controller 30 determines a turning compensation amount according to the yaw rate detected by the yaw rate sensor 20 (106). The turning compensation amount may be preset to correspond to the yaw rate. The turning compensation amount may be preset to correspond to the yaw rate and the wheel speed. In this case, the wheel speed is a reference wheel speed and may be a wheel speed of a reference wheel among the four wheels or an average wheel speed of the four wheel speeds. The turning compensation amount may be a value obtained by dividing the product of a detected yaw rate and a vehicle tread by the wheel speed.

The controller 30 compensates the indicators for the decompression determination based on the turning compensation amount (108). Among the indicators for the decompression determination, the controller 30 compensates T3 which is the time difference between $T_{FL}$ and $T_{RR}$ in comparison to $T_{RR}$ which is the time taken for one rotation of the tone wheel of the rear right wheel RR, and compensates T4 which is the time difference between $T_{FR}$ and $T_{RL}$ in comparison to $T_{RL}$ which is the time taken for one rotation of the tone wheel of the rear left wheel RL.

Figure 6:
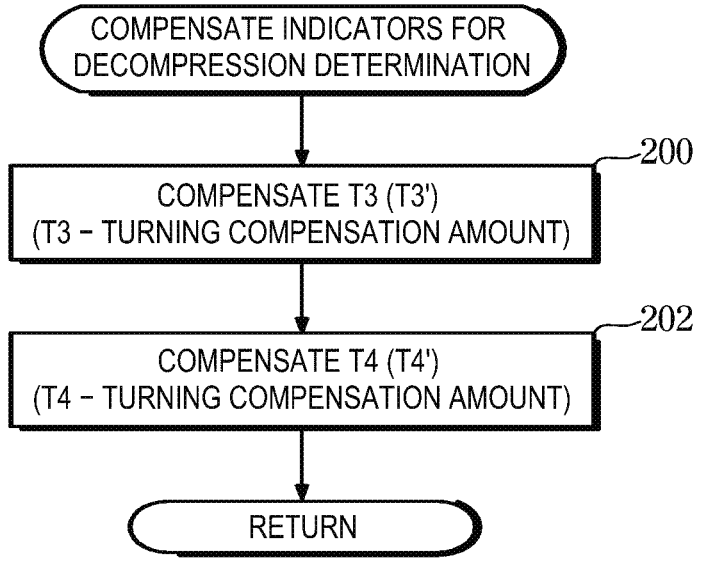
FIG. 6 is a control flowchart illustrating turning compensation of the indicators used for decompression determination in the indirect tire pressure monitoring method according to the first embodiment.

FIG. 6 is a control flowchart illustrating turning compensation of the indicators used for decompression determination in the indirect tire pressure monitoring method according to the first embodiment.

Referring to FIG. 6, the controller 30 compensates T3 based on the turning compensation amount (200).

T3 is compensated for turning as in the following equation 5.

$$T3'=T3-\text{turning compensation amount} \qquad \text{[Equation 5]}$$

Here, T3' is a turning-compensated T3. T3 is a value before turning compensation.

In addition, the controller 30 compensates T4 based on the turning compensation amount (202).

T4 is compensated for turning as in the following equation 6.

$$T4'=T4+\text{turning compensation amount} \qquad \text{[Equation 6]}$$

Here, T4' is a turning-compensated T4. T4 is a value before turning compensation.

In this way, the controller 30 performs the turning compensation on T3 by subtracting the turning compensation amount and for T4 by adding the turning compensation amount. Conversely, the controller 30 may perform the turning compensation on T3 by adding the turning compensation amount and for T4 by subtracting the turning compensation amount. It is sufficient to apply opposite signs of the turning compensation amounts to T3 and T4.

Referring to FIG. 4 again, the controller 30 determines whether the tire is decompressed based on the compensated decompression determination indicators T1, T2, T3', and T4' (110).

When the tire is determined to be decompressed (yes in 110), the controller 30 warns of the tire decompression through the display 40 (112).

The controller 30 compares the compensated decompression determination indicators T1, T2, T3', T4' with a predetermined table to determine whether the tire decompression occurs, thereby accurately estimating the tire decompression.

The controller 30 determines whether the tire decompression occurs by a combination of the compensated decompression determination indicators T1, T2, T3', T4'. It is possible to determine whether there is a decompressed tire among the four tires.

For example, among the compensated decompression determination indicators T1, T2, T3', T4', a first index Index 1 is determined according to T1 and T2, and a second index Index 2 is determined according to T3' and T4'. For example, the first index Index 1 may be –T1+T2, and the second index Index 2 may be –T3'+T4'. Index values corresponding to the first index Index 1 and the second index Index 2 are compared with a predetermined threshold value, and when the index values are higher than the predetermined threshold value, it may be determined that tire decompression occurs.

In this way, according to the present disclosure, by compensating the decompression determination indicators for turning using the turning compensation amount based on the yaw rate, an influence due to the turning traveling changing a wheel radius of the tire can be compensated for so that accuracy of the tire decompression determination can be improved.

Meanwhile, since changes of wheel radii of the left and right tires occur in the turning traveling, it is necessary to distinguish whether the results obtained from WRA are changed by pressure decompression based on whether the changes occur due to the influence of the turning traveling. As in the first embodiment, it is possible to compensate the decompression determination indicators for turning using the yaw rate detected by the yaw rate sensor. However, since the yaw rate sensor is not present in a relatively low-cost model, it is impossible to perform the turning compensation based on the yaw rate.

Hereinafter, turning compensation of the decompression determination indicator using a wheel speed instead of the yaw rate will be described.

In general, a change amount of a wheel radius of a tire due to decompression is smaller than a change amount of the wheel radius due to turning traveling. Therefore, when the decompression determination indicator is not compensated using the yaw rate, it is difficult to distinguish a change of the wheel radius due to the turning traveling from a change of the wheel radius due to decompression.

When the yaw rate sensor is installed, T3 and T4 among the decompression determination indicators, which are essentially compensated for turning using the yaw rate detected by the yaw rate sensor, are respectively compensated for turning through T3' and T4'. However, when the yaw rate sensor is not installed, a turning compensation amount may be determined based on the wheel speed, and T3 and T4 among the decompression determination indicators may be respectively compensated through T3" and T4" using the determined turning compensation amount.

Figure 7:
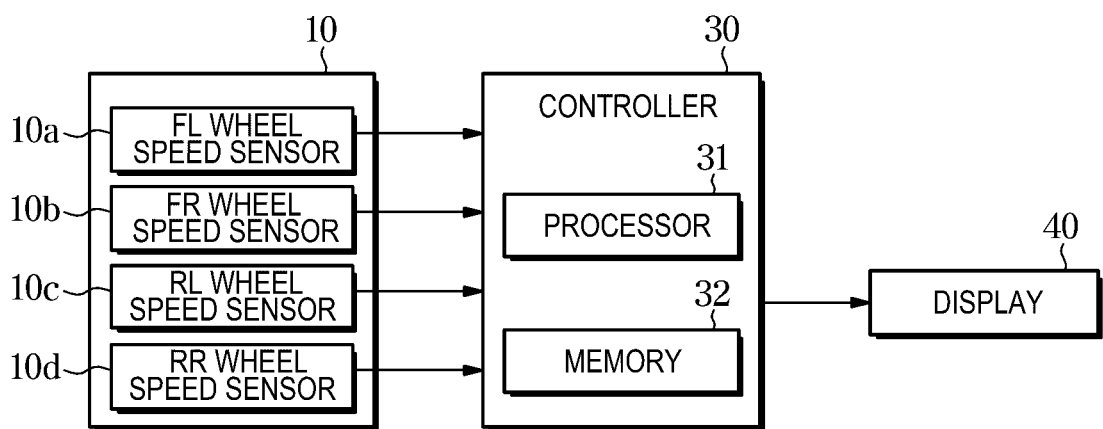
FIG. 7 is a control block diagram of an indirect tire pressure monitoring apparatus according to a second embodiment.

FIG. 7 is a control block diagram of an indirect tire pressure monitoring apparatus according to a second embodiment.

Referring to FIG. 7, only a wheel speed sensor 10 is electrically connected to a controller 30 without a yaw rate sensor.

The controller 30 determines indicators T1, T2, T3, and T4 for tire decompression determination from wheel speeds detected by the wheel speed sensor 10 and determines a turning compensation amount from the wheel speeds.

The controller 30 compensates the decompression determination indicators based on the turning compensation amount and determines whether each tire is decompressed based on the compensated decompression determination indicators T1, T2, T3", and T4".

Figure 8:
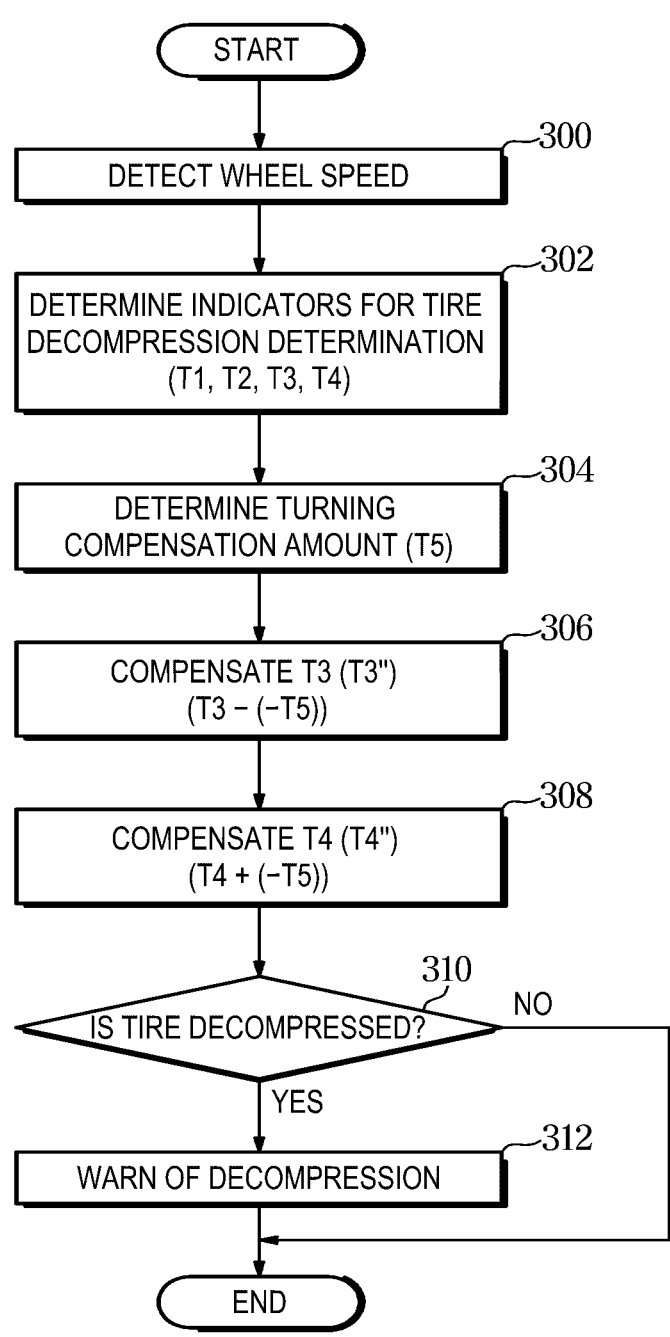
FIG. 8 is a control flowchart illustrating an indirect tire pressure monitoring method according to the second embodiment.
Figure 9:
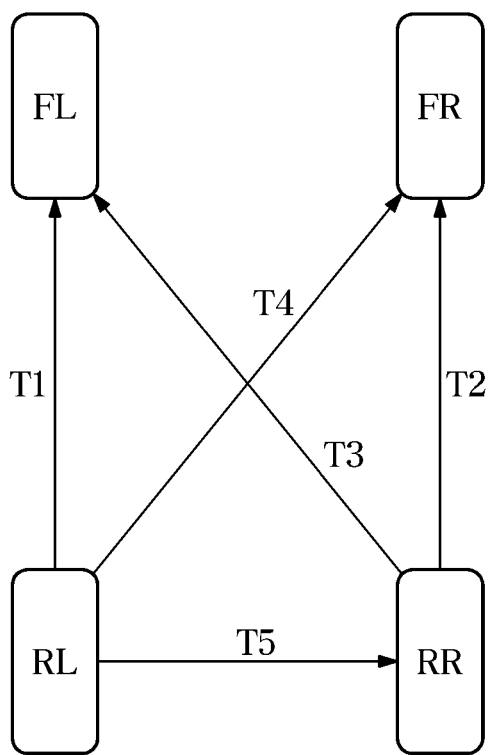
FIG. 9 is a diagram illustrating indicators and a turning compensation amount used for decompression determination in the indirect tire pressure monitoring method according to the second embodiment.

FIG. 8 is a control flowchart illustrating an indirect tire pressure monitoring method according to the second embodiment, and FIG. 9 is a diagram illustrating indicators and a turning compensation amount used for decompression determination in the indirect tire pressure monitoring method according to the second embodiment.

Referring to FIGS. 8 and 9, the controller 30 detects each wheel speed through the wheel speed sensor 10 first (300).

The controller 30 determines indicators for tire decompression determination using the wheel speeds (302).

The above-described T1, T2, T3, and T4 may be used as the indicators used for the tire decompression determination.

T1 may be obtained from wheel speeds of the rear left wheel RL and the front left wheel FL. T1 may be calculated according to a time $T_{RL}$ taken for one rotation of a tone wheel of the rear left wheel RL, and a time $T_{FL}$ taken for one rotation of a tone wheel of the front left wheel FL. For example, T1 may be a time difference between $T_{FL}$ and $T_{RL}$ in comparison to $T_{RL}$ which is the time taken for one rotation of the tone wheel of the rear left wheel RL.

T2 may be obtained from wheel speeds of the rear right wheel RR and the front right wheel FR. T2 may be calculated according to a time $T_{RR}$ taken for one rotation of a tone wheel of the rear right wheel RR, and a time $T_{FR}$ taken for one rotation of a tone wheel of the front right wheel FR. For example, T2 may be a time difference between $T_{FR}$ and $T_{RR}$ in comparison to $T_{RR}$ which is the time taken for one rotation of the tone wheel of the rear right wheel RR.

T3 may be obtained from the wheel speeds of the rear right wheel RR and the front left wheel FL. T3 may be calculated according to the time $T_{RR}$ taken for one rotation of the tone wheel of the rear right wheel RR, and the time $T_{FL}$ taken for one rotation of the tone wheel of the front left wheel FL. For example, T3 may be a time difference between $T_{FL}$ and $T_{RR}$ in comparison to $T_{RR}$ which is the time taken for one rotation of the tone wheel of the rear right wheel RR.

T4 may be obtained from the wheel speeds of the rear left wheel RL and the front right wheel FR. T4 may be calculated according to the time $T_{RL}$ taken for one rotation of the tone wheel of the rear left wheel RL, and the time $T_{FR}$ taken for one rotation of the tone wheel of the front right wheel FR. For example, T4 may be a time difference between $T_{FR}$ and $T_{RL}$ in comparison to $T_{RL}$ which is the time taken for one rotation of the tone wheel of the rear left wheel RL.

The controller 30 determines a turning compensation amount T5 according to the wheel speed (304). The controller 30 determines the turning compensation amount T5 according to the wheel speeds of the rear left wheel RL and the rear right wheel RR.

T5 may be calculated according to the time $T_{RL}$ taken for one rotation of the tone wheel of the rear left wheel RL, and the time $T_{RR}$ taken for one rotation of the tone wheel of the rear right wheel RR. For example, T5 may be a time difference between $T_{RR}$ and $T_{RL}$ in comparison to $T_{RL}$ which is the time taken for one rotation of the tone wheel of the rear left wheel RL.

T5 may be calculated as in the following equation 7.

$$T_5 = T_{RR} - T_{RL}/T_{RL} \qquad \text{[Equation 7]}$$

Here, $T_{RR}$ denotes the time taken for one rotation of the tone wheel of the rear right wheel RR, and $T_{RL}$ denotes the time taken for one rotation of the tone wheel of the rear left wheel RL.

Meanwhile, the turning compensation amount T5 may be calculated according to the time $T_{FL}$ taken for one rotation of the tone wheel of the front left wheel FL, and the time $T_{FR}$ taken for one rotation of the tone wheel of the front right wheel FR. For example, T5 may be a time difference between $T_{FR}$ and $T_{FL}$ in comparison to $T_{FL}$ which is the time taken for one rotation of the tone wheel of the front left wheel FL.

The controller 30 compensates T3 among the decompression determination indicators based on the turning compensation amount T5 (306). For example, the controller 30 compensates T3 which is a time difference between $T_{FL}$ and $T_{RR}$ in comparison to $T_{RR}$ which is the time taken for one rotation of the tone wheel of the rear right wheel RR.

T3 is compensated for turning as in the following equation 8.

$$T3''=T3-(-T5) \qquad \text{[Equation 8]}$$

Here, T3'' denotes T3 compensated for turning, T3 denotes a value before the turning compensation, and T5 denotes the turning compensation amount.

In addition, the controller 30 compensates T4 based on the turning compensation amount T5 (308). The controller 30 compensates T4 which is a time difference between $T_{FR}$ and $T_{RL}$ in comparison to $T_{RL}$ which is the time taken for one rotation of the tone wheel of the rear left wheel RL.

T4 is compensated for turning by the following equation 9.

$$T4''=T4+(-T5) \qquad \text{[Equation 9]}$$

Here, T4'' denotes T4 compensated for turning, T4 denotes a value before the turning compensation, and T5 denotes the turning compensation amount.

In this way, the controller 30 performs the turning compensation on T3 by subtracting the opposite of the turning compensation amount and the turning compensation on T4 by adding the opposite of the turning compensation amount. Conversely, the controller 30 may perform the turning compensation on T3 by adding the opposite of the turning compensation amount and the turning compensation on T4 by subtracting the opposite of the turning compensation amount. It is sufficient to apply opposite signs of the turning compensation amounts to T3 and T4.

Figure 10:
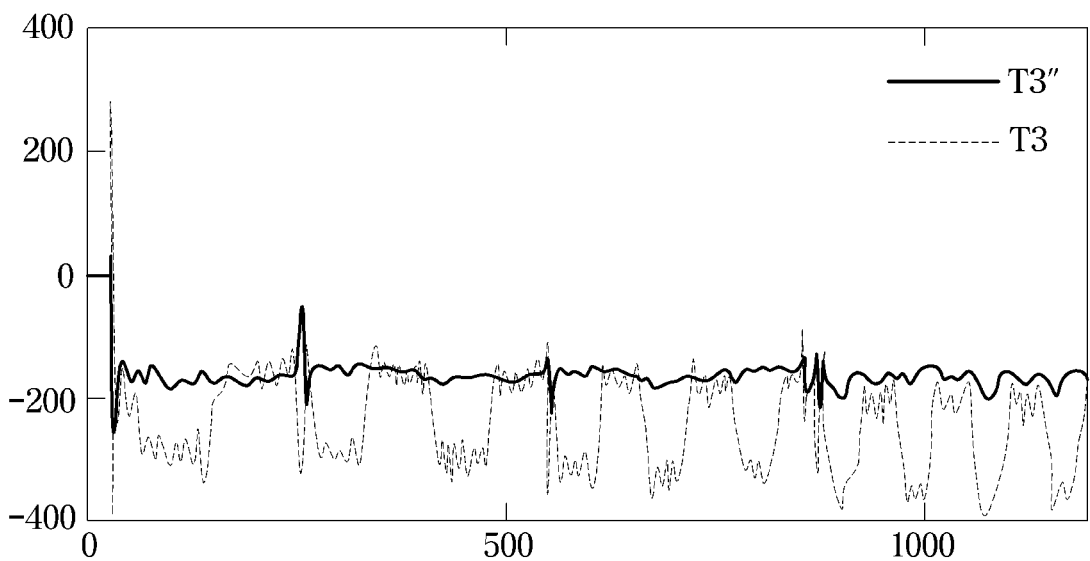
FIG. 10 is a graph showing T3 before turning compensation and T3" after the turning compensation in the indirect tire pressure monitoring method according to the second embodiment.
Figures 11, 12:
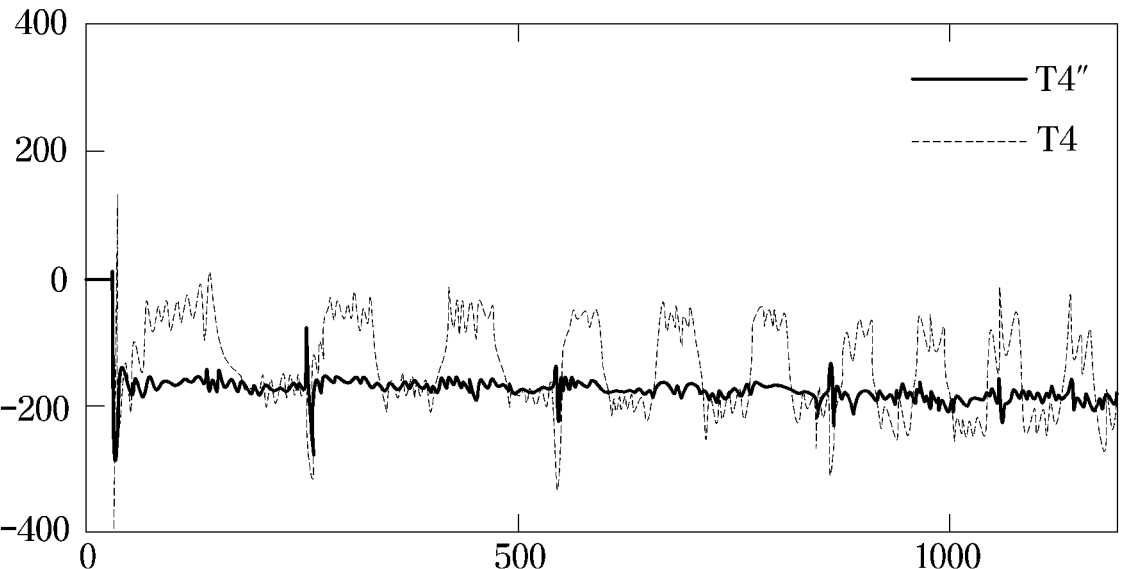
FIG. 11 is a graph showing T4 before the turning compensation and T4" after the turning compensation in the indirect tire pressure monitoring method according to the second embodiment.
FIG. 12 is a diagram illustrating a table for describing tire decompression determination in the indirect tire pressure monitoring method according to the second embodiment.

FIG. 10 is a graph showing T3 before the turning compensation and T3'' after the turning compensation in an indirect tire pressure monitoring method according to the second embodiment, and FIG. 11 is a graph showing T4 before the turning compensation and T4'' after the turning compensation in the indirect tire pressure monitoring method according to the second embodiment.

Referring to FIGS. 10 and 11, T3 and T4 which are data before the turning compensation, and T3'' (T3''=T3−(−T5)) and T4'' (T4''=T4+(−T5)) to which the turning compensation is applied only using the wheel speed sensor are shown.

It can be seen that a distribution range of the data before the turning compensation was +/−100, but after the turning compensation, the distribution range was reduced by a factor of ten or more to +/−10.

The controller 30 determines whether the tire is decompressed based on the compensated decompression determination indicators T1, T2, T3'', and T4'' (310).

When the tire is determined to be decompressed (yes in 310), the controller 30 warns of the tire decompression through the display 40 (312).

FIG. 12 is a diagram illustrating a table for describing tire decompression determination in the indirect tire pressure monitoring method according to the second embodiment.

Referring to FIG. 12, the table shows signs of the first index Index 1 and the second index Index 2 for each tire decompression position.

The first index Index 1 and the second index Index 2 are combinations of the mathematical expressions T1, T2, T3'', and T4''. For example, the first index Index 1 may be −T1+T2, and the second index Index 2 may be −T3'+T4'.

Whether the tire is decompressed may be determined from an increase or a decrease of the first index Index 1 and the second index Index 2 compared to a normal pressure. That is, index values corresponding to the first index Index 1 and the second index Index 2 are compared with a predetermined threshold value, and when the index values are higher than the predetermined threshold value, it may be determined that the tire decompression occurs. In this way, it is possible to determine whether there is a decompressed tire among the four tires from a combination of the compensated decompression determination indicators T1, T2, T3', and T4'.

As described above, according to the present disclosure, the decompression determination indicators may be compensated for turning using the turning compensation amount based on the wheel speed instead of the yaw rate. Therefore, according to the present disclosure, the decompression determination indicators may be compensated for turning using only the wheel speed sensor even in a vehicle not equipped with the yaw rate sensor. Thus, according to the present disclosure, an influence due to the turning traveling changing the wheel radius of the tire may be compensated even for the vehicle not equipped with the yaw rate sensor so that the accuracy of the tire decompression determination can be improved.

Meanwhile, the above-described controller and/or components thereof may include one or more processor(s)/microprocessor(s) combined with a computer-readable recording medium storing computer-readable codes/algorithms/software. The one or more processor(s)/microprocessor(s) may execute the computer-readable codes/algorithms/software stored in the computer-readable recording medium to perform the above-described functions, operations, and steps.

The above-described controller and/or the components thereof may further include a memory implemented as a computer-readable non-transitory recording medium or a computer-readable temporary recording medium. The memory may be controlled by the above-described controller and/or the components thereof and may be configured to store data transmitted to or received from the above-described controller and/or the components thereof or to store data that has been or will be processed by the above-described controller and/or the components thereof.

The disclosed embodiments may also be implemented as computer-readable codes/algorithms/software on a computer-readable recording medium. The computer-readable recording medium may be a computer-readable non-transitory recording medium such as a data storage device capable of storing data which can be read by a processor/microprocessor. Examples of the computer-readable recording medium include a hard disk drive (HDD), a solid state drive (SSD), a silicon disk drive (SDD), a read-only memory (ROM), a compact disc (CD) ROM (CD-ROM), a magnetic tape, a floppy disk, and an optical data storage device.

As is apparent from the above description, an indirect tire pressure monitoring apparatus and method can compensate for a change in tire wheel radius of a tire due to turning traveling using a yaw rate sensor, thereby improving the accuracy of tire decompression determination.

The indirect tire pressure monitoring apparatus and method can compensate for the change in tire wheel radius of the tire due to turning traveling using a wheel speed sensor instead of the yaw rate sensor, thereby improving the accuracy of the tire decompression determination.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An indirect tire pressure monitoring apparatus comprising:

a controller electrically connected to a wheel speed sensor configured to detect a wheel speed, wherein the controller is configured to:

obtain a first time taken for one rotation of a tone wheel of a rear left wheel RL, a second time taken for one rotation of a tone wheel of a front left wheel FL, a third time taken for one rotation of a tone wheel of a rear right wheel RR, and a fourth time taken for one rotation of a tone wheel of a front right wheel FR, determine a decompression determination indicator including a first indicator which is a time difference between the second time and the first time in comparison to the first time, a second indicator which is a time difference between the fourth time and the third time in comparison to the third time, a third indicator which is a time difference between the second time and the third time in comparison to the third time, and a fourth indicator which is a time difference between the fourth time and the first time in comparison to the first time, determine a turning compensation amount for turning compensation of the decompression determination indicator based on the wheel speed or a yaw rate detected by a yaw rate sensor, compensate the decompression determination indicator based on the turning compensation amount, and determine whether the tire is decompressed based on the compensated decompression determination indicator.

2. The indirect tire pressure monitoring apparatus of claim 1, wherein the controller is configured to compensate the third indicator and the fourth indicator by applying values of opposite signs of the turning compensation amount to the third indicator and the fourth indicator.

3. The indirect tire pressure monitoring apparatus of claim 2, wherein the controller is configured to: determine a first index according to the first indicator and the second indicator, determine a second index according to a compensated third indicator and a compensated fourth indicator, and determine whether a tire is decompressed based on the first index and the second index.

4. The indirect tire pressure monitoring apparatus of claim 1, wherein the controller is configured to determine a fifth indicator, which is a time difference between the third time and the first time in comparison to the first time or a time difference between the fourth time and the second time in comparison to the second time, as the turning compensation amount.

5. The indirect tire pressure monitoring apparatus of claim 4, wherein the controller is configured to compensate the third indicator and the fourth indicator by applying values of opposite signs of the turning compensation amount to the third indicator and the fourth indicator.

6. The indirect tire pressure monitoring apparatus of claim 5, wherein the controller is configured to: determine a first index according to the first indicator and the second indicator, determine a second index according to a compensated third indicator and a compensated fourth indicator, and determine whether a tire is decompressed based on the first index and the second index.

7. The indirect tire pressure monitoring apparatus of claim 1, wherein the controller is configured to determine the turning compensation amount based on a time difference between a tone wheel of a left wheel and a tone wheel of a right wheel.

8. An indirect tire pressure monitoring method comprising:

obtaining a wheel speed of each wheel through a controller electrically connected to a wheel speed sensor;

obtaining a first time taken for one rotation of a tone wheel of a rear left wheel RL, a second time taken for one rotation of a tone wheel of a front left wheel FL, a third time taken for one rotation of a tone wheel of a rear right wheel RR, and a fourth time taken for one rotation of a tone wheel of a front right wheel FR;

determining a decompression determination indicator including a first indicator which is a time difference between the second time and the first time in comparison to the first time, a second indicator which is a time difference between the fourth time and the third time in comparison to the third time, a third indicator which is a time difference between the second time and the third time in comparison to the third time, and a fourth indicator which is a time difference between the fourth time and the first time in comparison to the first time;

determining a turning compensation amount for turning compensation of the decompression determination indicator based on the wheel speed or a yaw rate detected by a yaw rate sensor;

compensating the decompression determination indicator based on the turning compensation amount; and determining whether a tire is decompressed based on the compensated decompression determination indicator.

9. The indirect tire pressure monitoring method of claim 8, wherein the determining of the decompression determination indicator comprises compensating the third indicator and the fourth indicator by applying values of opposite signs of the turning compensation amount to the third indicator and the fourth indicator.

10. The indirect tire pressure monitoring method of claim 9, wherein the determining of whether the tire is decompressed comprises: determining a first index according to the first indicator and the second indicator, determining a second index according to a compensated third indicator and a compensated fourth indicator, and determining whether a tire is decompressed based on the first index and the second index.

11. The indirect tire pressure monitoring method of claim 8, wherein the determining of the turning compensation amount comprises determining a fifth indicator, which is a time difference between the third time and the first time in comparison to the first time or a time difference between the fourth time and the second time in comparison to the second time, as the turning compensation amount.

12. The indirect tire pressure monitoring method of claim 11, wherein the compensating of the decompression determination indicator comprises compensating the third indicator and the fourth indicator by applying values of opposite signs of the turning compensation amount to the third indicator and the fourth indicator.

13. The indirect tire pressure monitoring method of claim 12, wherein the determining of whether the tire is decompressed comprises: determining a first index according to the first indicator and the second indicator, determining a second index according to a compensated third indicator and a compensated fourth indicator, and determining whether a tire is decompressed based on the first index and the second index.

14. The indirect tire pressure monitoring method of claim 8, wherein the determining of the turning compensation amount comprises determining the turning compensation amount based on a time difference between a tone wheel of a left wheel and a tone wheel of a right wheel.

* * * * *